(12) United States Patent
Fenton et al.

(10) Patent No.: US 7,444,912 B2
(45) Date of Patent: Nov. 4, 2008

(54) PORTABLE SAWMILL WITH BI-DIRECTIONAL CUTTING CIRCULAR SAWS

(76) Inventors: David S. Fenton, General Delivery, Grovedale, Alberta (CA) T0H 1X0; Lester D. Oilund, 9862 Prairie Road, Grande Prairie, Alberta (CA) T8V 3R9

( * ) Notice: Subject to any disclaimer, the term of this patent is extended or adjusted under 35 U.S.C. 154(b) by 623 days.

(21) Appl. No.: 11/204,617

(22) Filed: Aug. 16, 2005

(65) Prior Publication Data
US 2006/0179982 A1    Aug. 17, 2006

(30) Foreign Application Priority Data
Aug. 17, 2004    (CA) .................................... 2479428

(51) Int. Cl.
*B26D 7/06* (2006.01)
(52) U.S. Cl. .................. 83/425.2; 83/471.2; 83/487; 83/488; 83/489; 83/492; 144/3.1; 144/1.1
(58) Field of Classification Search ............. 144/1.1, 144/2.1, 3.1; 83/425.2, 469–492
See application file for complete search history.

(56) References Cited

U.S. PATENT DOCUMENTS

| | | | |
|---|---|---|---|
| 4,148,344 A | 4/1979 | Critchell et al. | |
| 4,177,704 A | 12/1979 | Randle | |
| 4,228,708 A | 10/1980 | Martin | |
| 4,262,572 A | 4/1981 | Flodin | |
| 4,584,918 A | 4/1986 | Stubbe et al. | |
| 5,213,022 A | 5/1993 | Elgan | |
| 5,579,671 A * | 12/1996 | Bowlin ........................ 83/75.5 |
| 5,785,102 A * | 7/1998 | Hamel ........................ 144/387 |
| 5,813,512 A | 9/1998 | Andersson et al. | |
| 5,921,376 A | 7/1999 | Michell et al. | |
| 6,038,954 A | 3/2000 | Keener | |
| 6,128,989 A * | 10/2000 | Jones et al. .................... 83/156 |
| 6,199,683 B1 | 3/2001 | Michell et al. | |
| 2003/0015256 A1* | 1/2003 | Quenneville ................. 144/357 |

FOREIGN PATENT DOCUMENTS

| | | |
|---|---|---|
| DE | 297 12 044 U1 | 9/1998 |
| DE | 201 18 312 U1 | 5/2002 |
| DE | 101 52 247 A1 | 4/2003 |

* cited by examiner

*Primary Examiner*—Shelley Self
(74) *Attorney, Agent, or Firm*—Davis Bujold & Daniels, P.L.L.C.

(57) ABSTRACT

A portable sawmill with bi-directional cutting circular saws includes a saw support pivotally mounted to a primary support structure for pivotal movement about a pivot axis which is transverse to the direction of movement. Two circular saws are rotatably mounted one above the other on the saw support. A first one of the two circular saws rotates in a first rotational direction and a second one of the two circular saws rotates in a second rotational direction. The teeth on both of the two circular saws are always moving toward a log resting on the log support as the log is being cut. An actuator is provided for selectively pivoting the saw support to invert the positioning of the two circular saws so that the teeth on both of the two circular saws continue to move toward the log being cut upon a change in direction occurring.

28 Claims, 19 Drawing Sheets

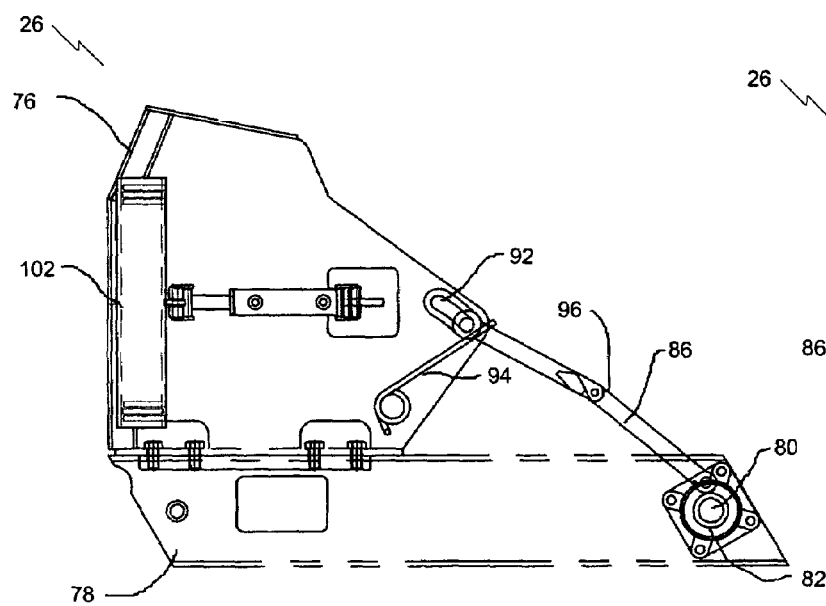
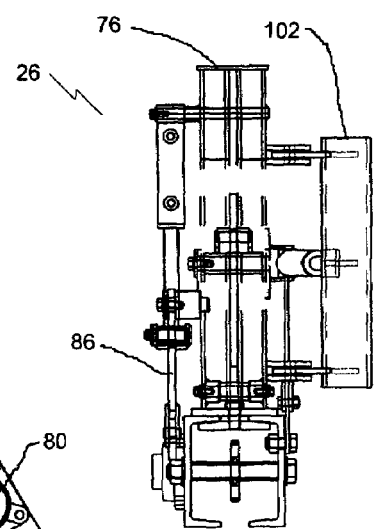
FIGURE 18
FIGURE 19

US 7,444,912 B2

PORTABLE SAWMILL WITH BI-DIRECTIONAL CUTTING CIRCULAR SAWS

This application claims priority from Canadian application Ser. No. 2,479,428 filed Aug. 17, 2004.

FIELD OF THE INVENTION

The present invention relates to a portable sawmill that uses bi-directional cutting circular saws.

BACKGROUND OF THE INVENTION

Most portable sawmills use band saws for bi-directional sawing. While band saws have a thinner kerf, it is hard to keep the band blade tracking a straight line through a round log, without dipping or diving. Band blades tend to produce a wavy cut. Sometimes an entire board or blank is wasted due to in accurate dimensions. Band saws are high maintenance and do not perform well in conditions in which the wood has been contaminated due to harvesting methods or environmental conditions. Circular saws lessen these problems, but do not lend themselves to bi-directional sawing. Traditional mills that use circular saws cut in one direction only, so that the return cycle is wasted time.

SUMMARY OF THE INVENTION

What is required is a portable sawmill with bidirectional cutting circular saws.

According to the present invention there is provided a portable sawmill with bi-directional cutting circular saws which includes a primary support structure having a first end and a second end. A log support is supported by the primary support structure. A saw support is supported by the primary support structure above the log support. Means is provided for relative movement between the log support and the saw support in a first direction from the first end toward the second end and in a second direction from the second end toward the first end. This could involve movement of the log support, the saw support or both. The saw support is pivotally mounted to the primary support structure for pivotal movement about a pivot axis which is transverse to the direction of movement. Two circular saws are rotatably mounted one above the other on the saw support. A first one of the two circular saws rotates in a first rotational direction and a second one of the two circular saws rotates in a second rotational direction. The teeth on both of the two circular saws are always moving toward a log resting on the log support as the log is being cut. An actuator is provided for selectively pivoting the saw support to invert the positioning of the two circular saws so that the teeth on both of the two circular saws continue to move toward the log being cut upon a change in direction occurring.

There will hereinafter be described some additional features, which further improve the operation of the portable sawmill.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein:

FIG. 18 is a detailed side elevation view of the center log support.

FIG. 19 is a detailed top plan view of the center log support.

DETAILED DESCRIPTION OF THE PREFERRED EMBODIMENT

Figure 1:
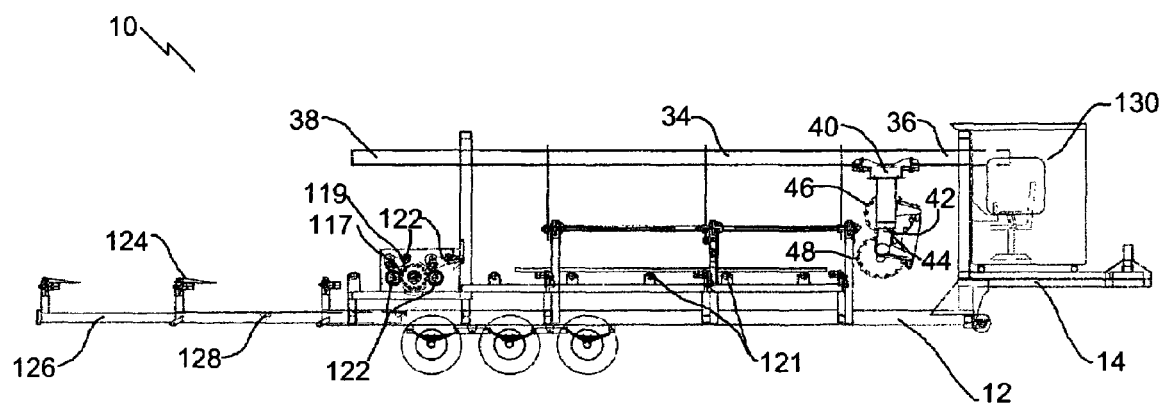
FIG. 1 is a side elevation view of the portable sawmill with bidirectional cutting circular saws constructed in accordance with the teachings of the present invention.

The preferred embodiment, a portable saw mill generally identified by reference numeral 10, will now be described with reference to FIGS. 1 through 21.

Figure 6:
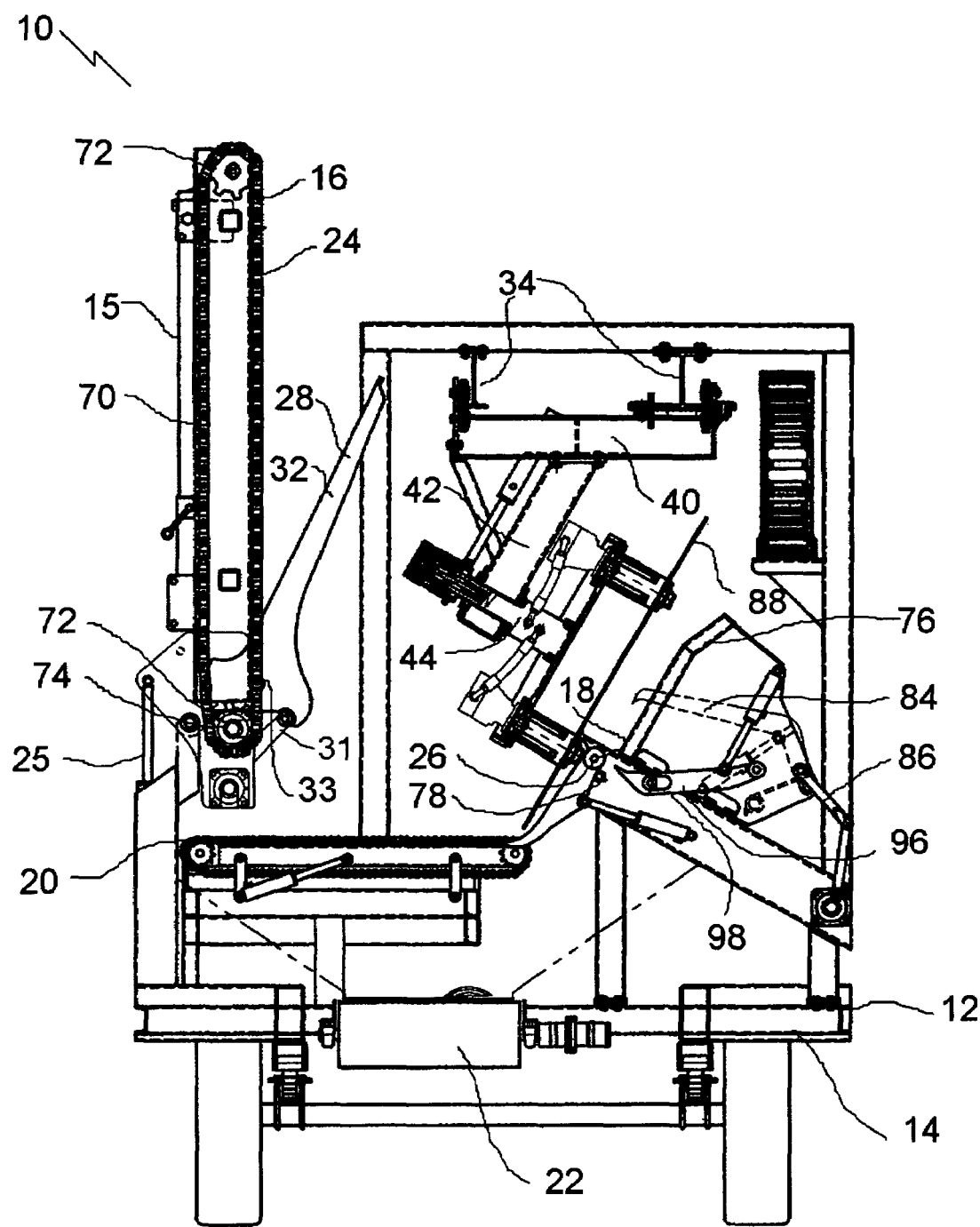
FIGS. 6 through 14 are front elevation views in partial section of the portable sawmill of FIG. 1 in various stages of operation.
Figure 7:
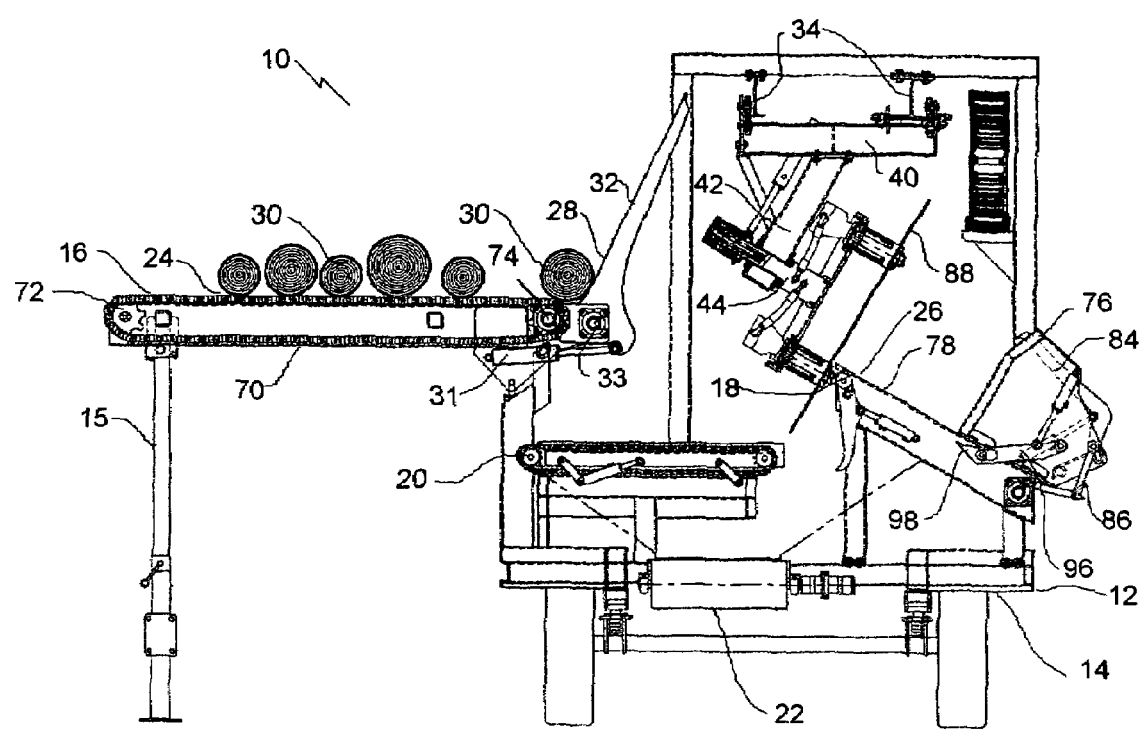

Structure and Relationship of Parts:

Referring now to FIG. 1, there is shown portable sawmill 10 with bi-directional cutting circular saws including a primary support structure 12 in the form of a trailer 14, such as a tractor trailer, adapted to be pulled by a tractor truck and having leveling jacks 15 illustrated in FIGS. 6 and 7. Referring to FIG. 7, trailer 14 is designed to be compact and has a top level 16, a second level 18, a third level 20, a fourth level (represented by outfeed transfer 124 shown in FIGS. 1 and 3) or fifth or bottom level 22. On top level 16 of trailer 14 is a log deck 24 which has a substantially vertical transport position as shown in FIG. 6, and a substantially horizontal operative position as shown in FIG. 7. Referring to FIG. 6, a telescopic actuator 25 is provided to move log deck 24 between the transport position and the operative position, and leveling jacks 15 support log deck 24 in the operative position. On second level 18 there is a log support 26, shown in greater detail in FIG. 16.

Figure 8:
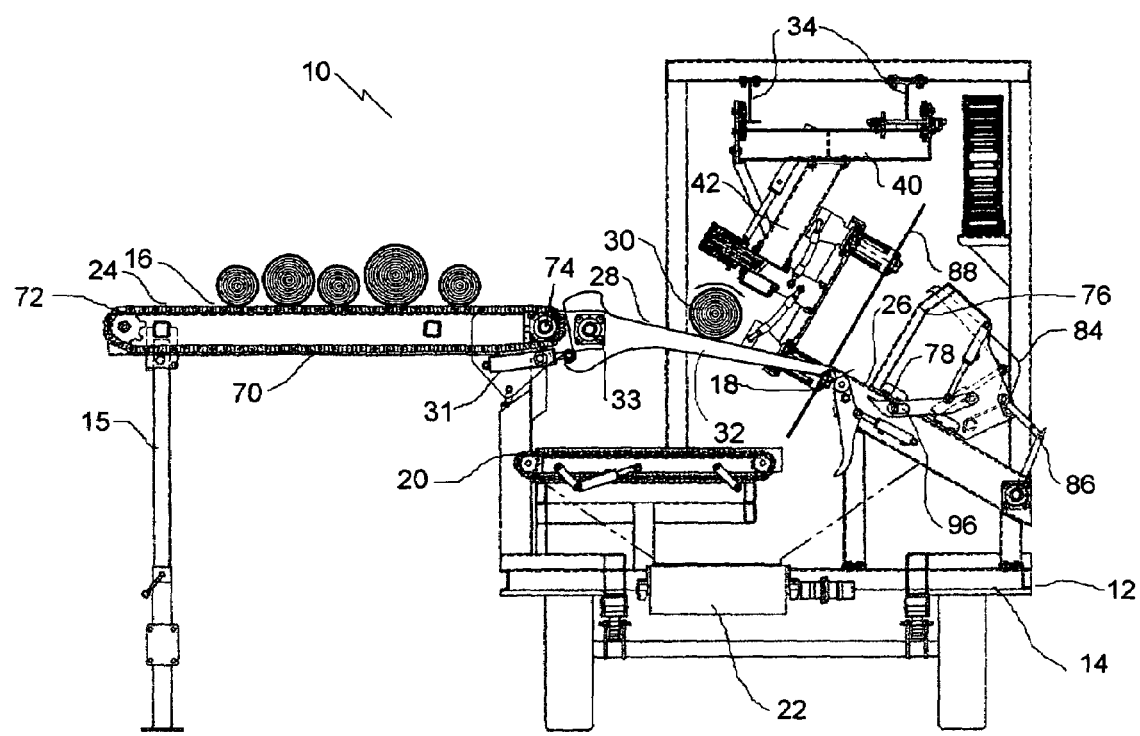
Figure 9:
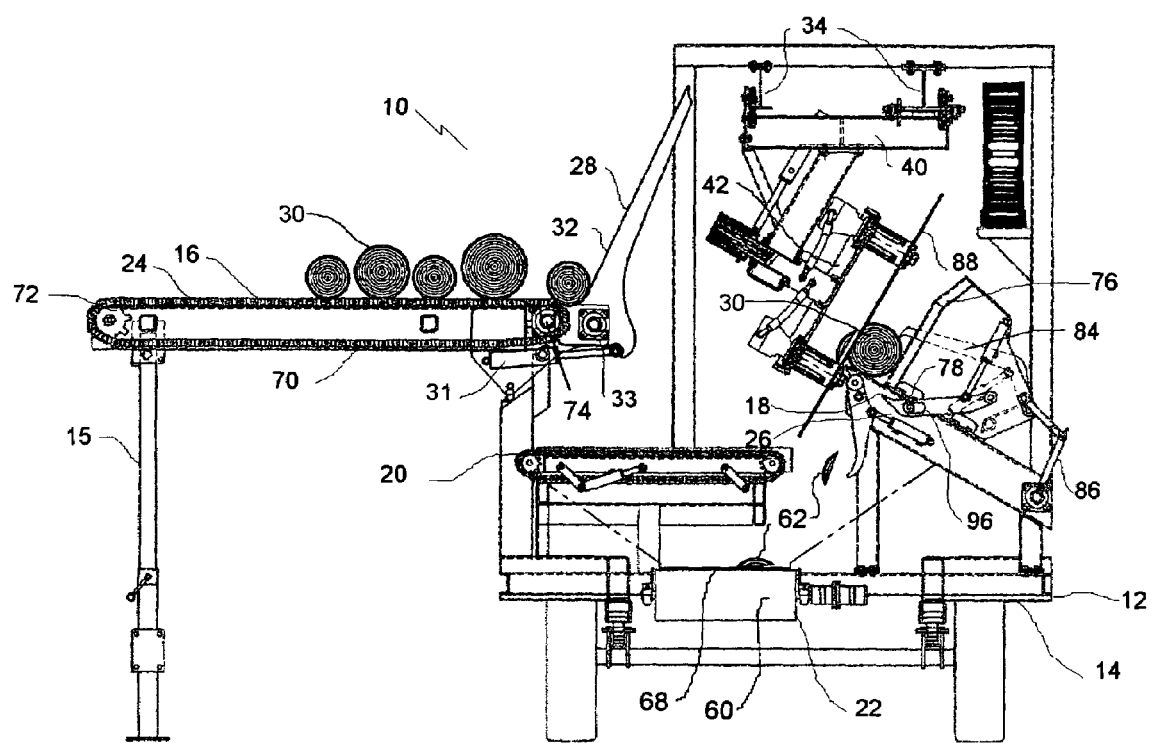
Figure 16:
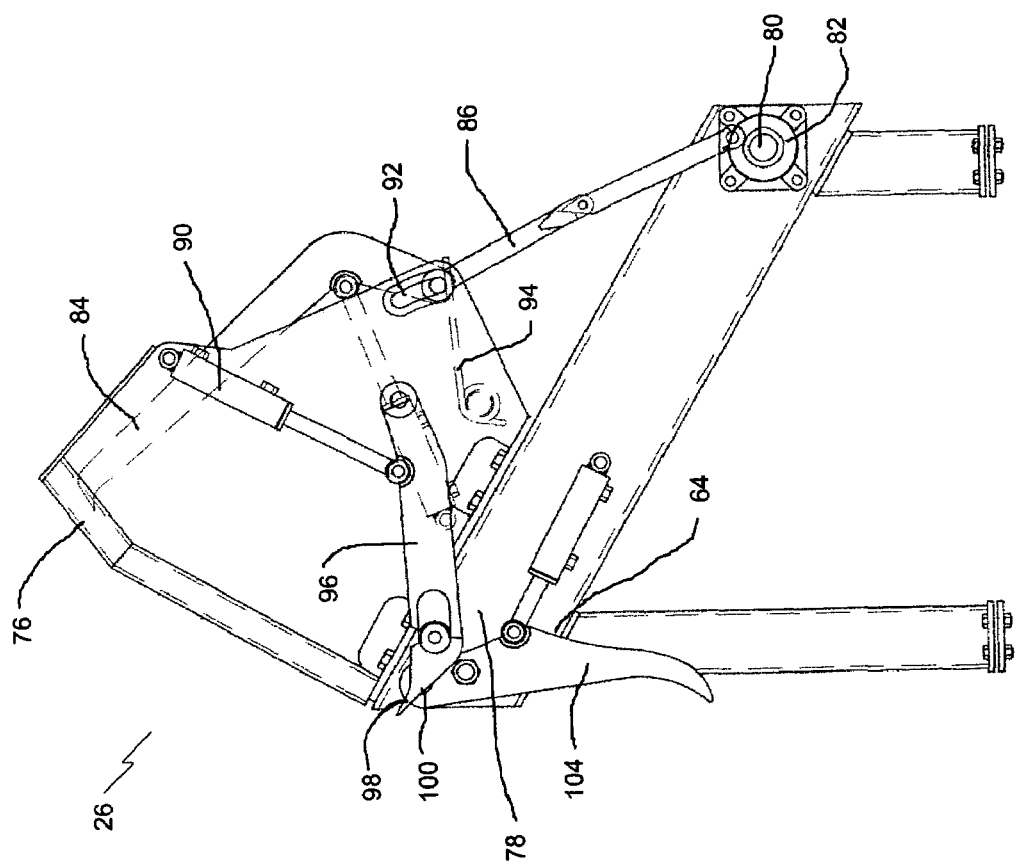
FIG. 16 is a detailed side elevation view of the log support in an extended position.
Figure 17:
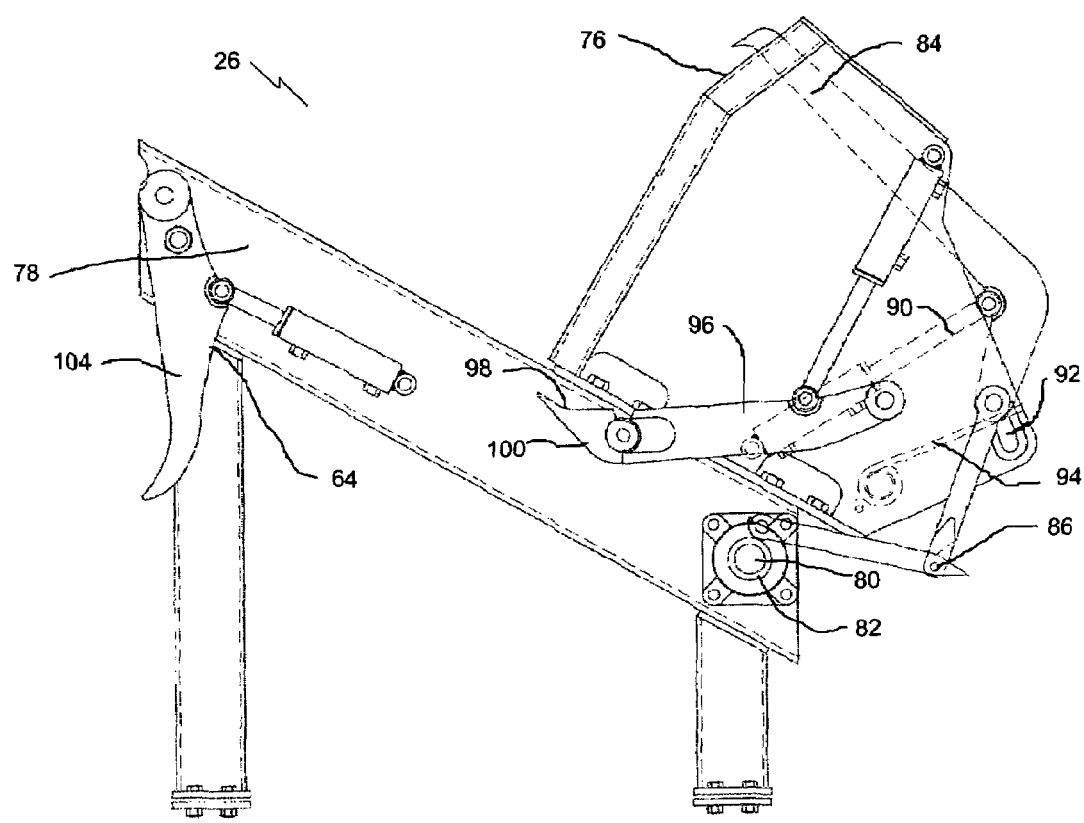
FIG. 17 is a detailed side elevation view of the log support in a retracted position.
Figure 20:
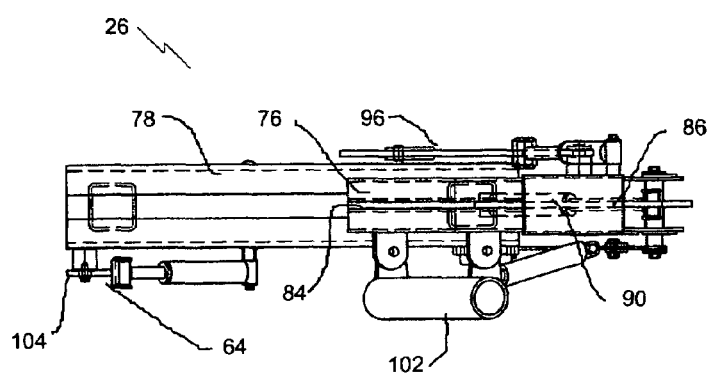
FIG. 20 is a detailed top plan view of the center log support.
Figure 21:
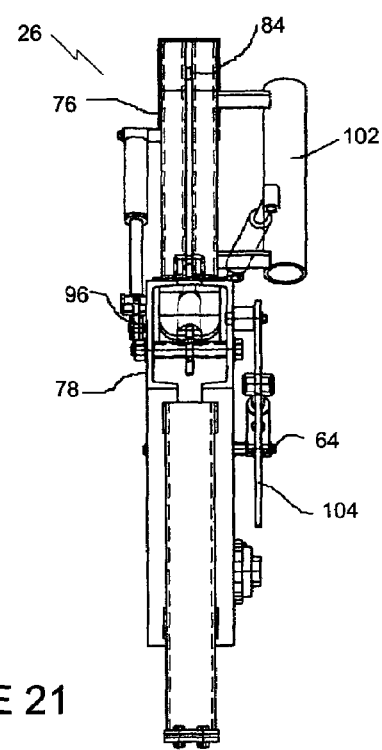
FIG. 21 is a detailed front elevation view of the center log support.

Referring to FIG. 7, log deck 24 has chains 70 with sprockets 72 on a common shaft 74 driven by a hydraulic motor (not shown) to move logs 30 towards a log loader 28, which moves logs 30 from log deck 24 to log support 26. Chains 70 are intermittently driven to feed logs 30 to log loader 28. Log loader 28 has arms 32 pivotally mounted to log deck 24 which are moved by telescopic actuators 31 from a non-loading position as shown in FIG. 7 to a loading position as shown in FIG. 8. Arms 32 are coupled and rotate about the axis of a shaft 33. In the loading position, arms 32 are downwardly inclined such that logs 30 move by force of gravity down arms 32 and come to rest on log support 26 as shown in FIG. 9. Referring now to FIG. 17, log support 26 has head blocks 76 and bunks 78. Head blocks 76 are movable to suit various log diameters, as head blocks 76 are coupled to a shaft 80, sprockets 82, and roller chains (not shown). Shaft 80 is hydraulically driven such that head blocks 76 are moved in unison to set for various log diameters. Each head block 76 has a dog 84 for securing a log during sawing. Dog 84 is hydraulically moved down by telescopic actuator 90 and comes to rest on a log. It can then move upward to release the log or the board, as the case may be. Each dog 84 has an arresting link 86 that limits travel of dog 84 with head block 76 relative to a saw line 88 (seen in FIG. 9), so that dog 84 does not impinge upon saw line 88. Head blocks 76 are free to travel to the end of bunks 78 as shown in FIG. 16 to force the last piece off bunks 78. Dog 84 is pivotally anchored in slot 92, which also allows for some lateral movement. A spring 94 biases dog 84 to the front of slot 92. As arresting links 86 reach their full extension, dogs 84 are stopped from advancing and head blocks 76 can continue to advance, drawing dog's 84 pivotal connection back in the slot against the tension of spring 94. When head blocks 76 recede, arresting links 86 fold and springs 94 move dogs 84 forward in slot 92, ready to secure the next log. Each head block 76 includes a log turner 96, where log turners 96 are in the form of hooks 98 which engage a log which is supported on log support 26 from below and retract to an underlying position after rotating the log, ready to rotate the next log. Hooks 98 on log turners 96 have pivoting tips 100 that pivot to facilitate hooks 98 disengaging from the log and retracting, such that the log is not dragged down. FIG. 19 shows a top view of the arrangement discussed, and FIG. 20 shows a front view. Referring now to FIG. 18, the center head block 76 of log support 26 has a log taper offset 102. This is used to move the center core of the log out towards saw line 88 and into the longitudinal path of the two circular saws 46 and 48, thereby increasing wood recovery from tapered logs.

Figure 2:
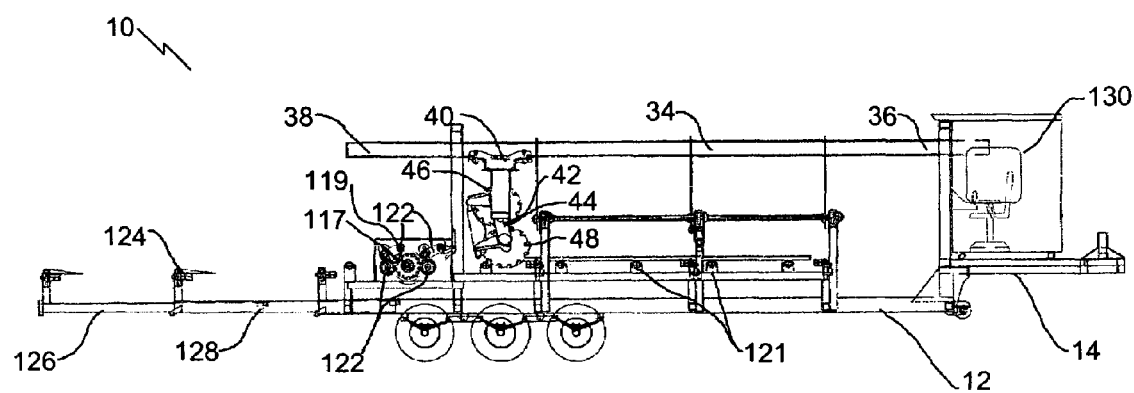
FIG. 2 is a side elevation view of the portable sawmill of FIG. 1 with bi-directional cutting circular saws moved to the other end of the trailer.
Figure 3:
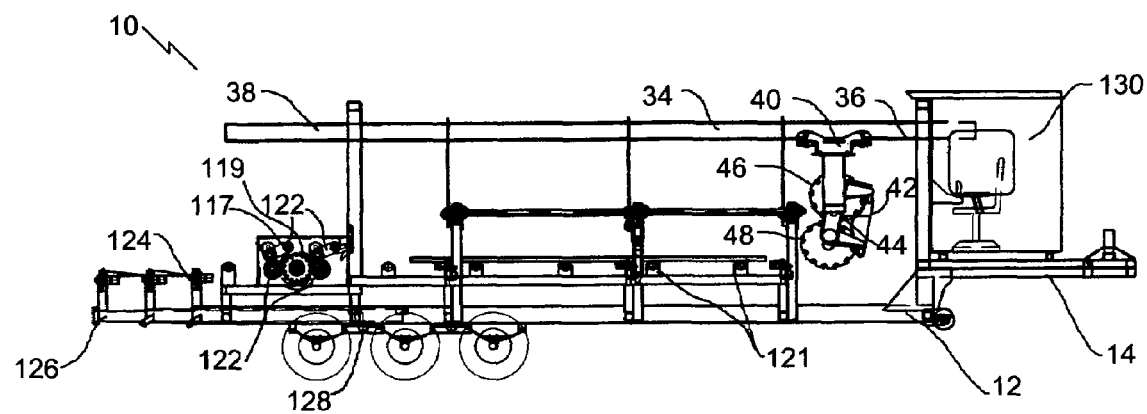
FIG. 3 is a side elevation view of the portable sawmill of FIG. 1 with the outfeed transfer retracted.
Figure 4:
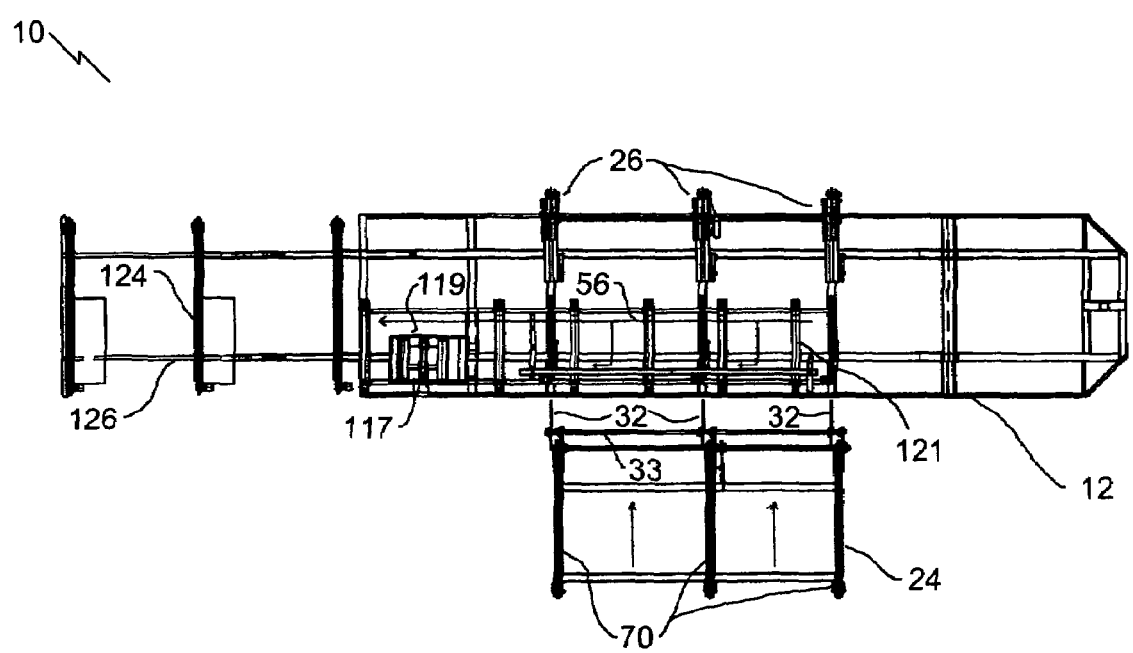
FIG. 4 is a top plan view with both infeed and outfeed transfers extended.
Figure 5:
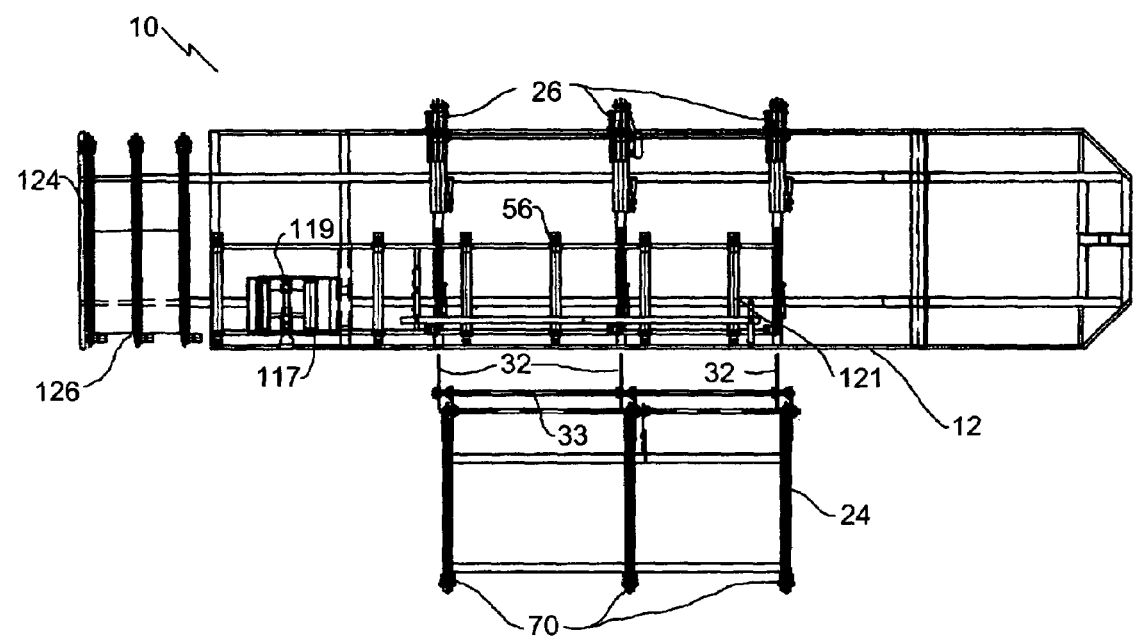
FIG. 5 is a top plan view of the portable sawmill of FIG. 1 with the outfeed transfer retracted.
Figure 10:
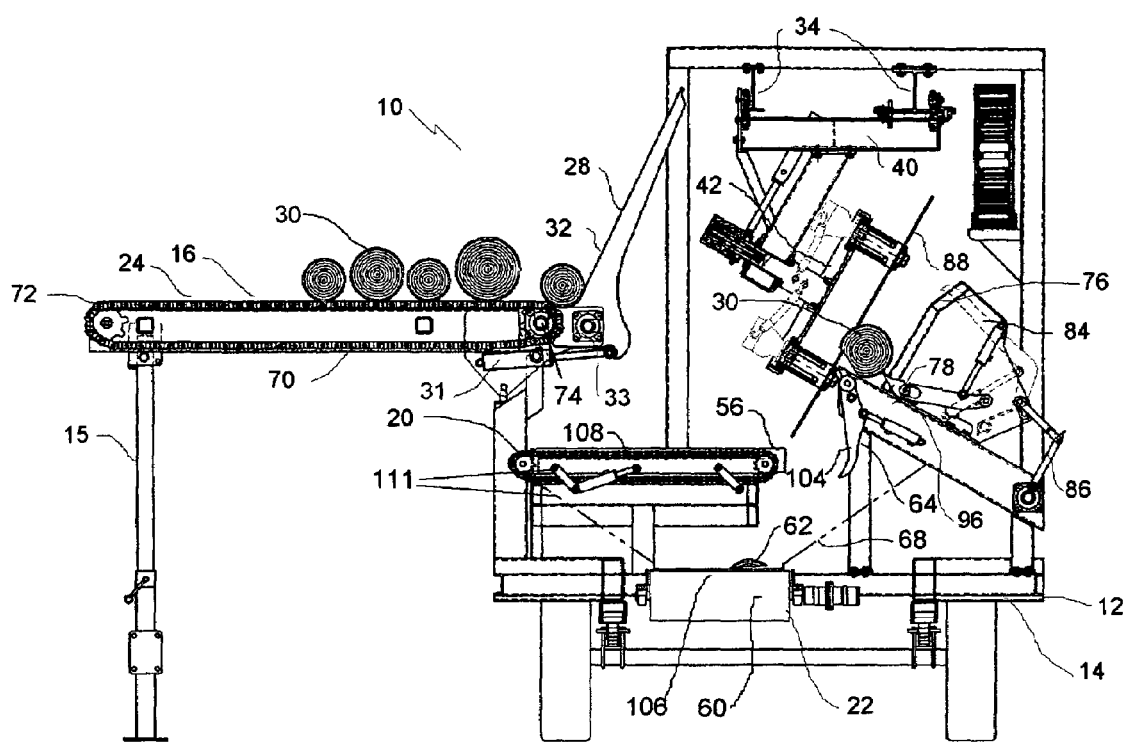
Figure 11:
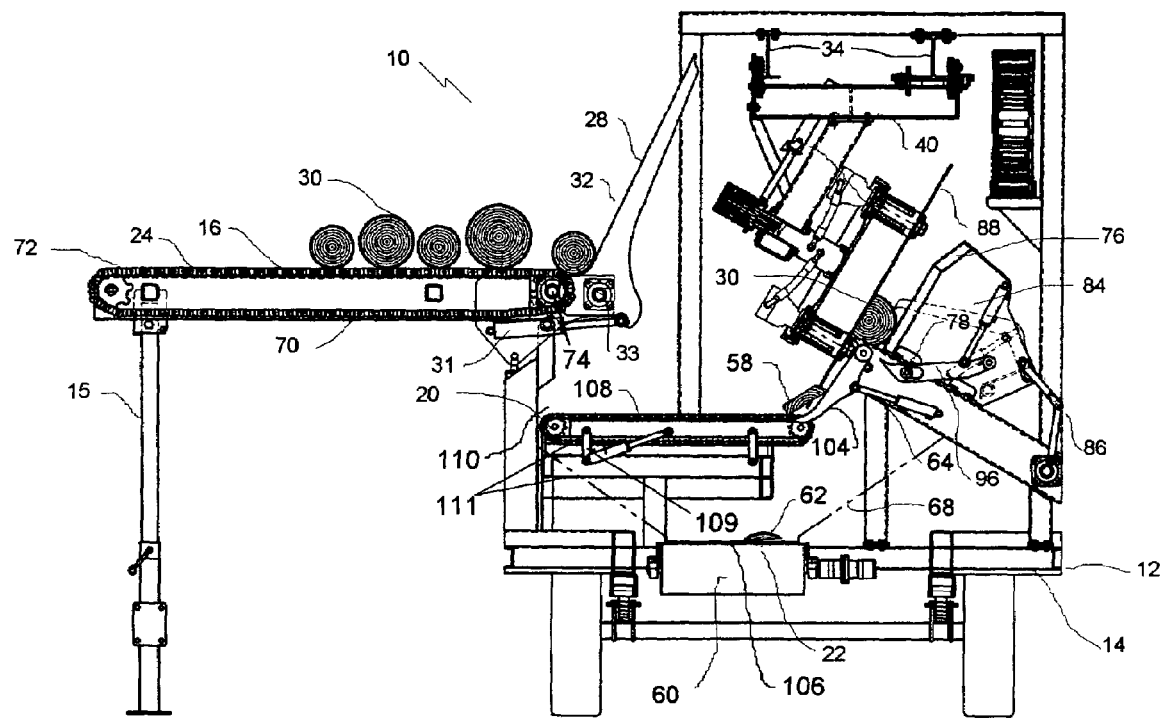
Figure 12:
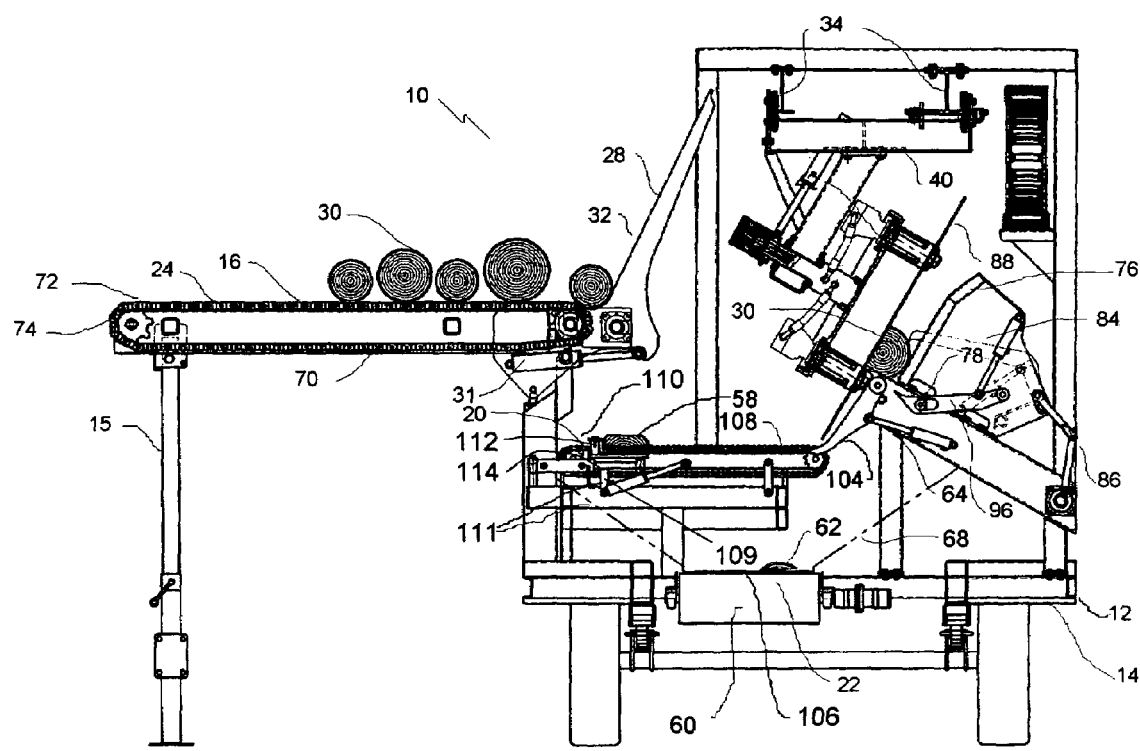
Figure 13:
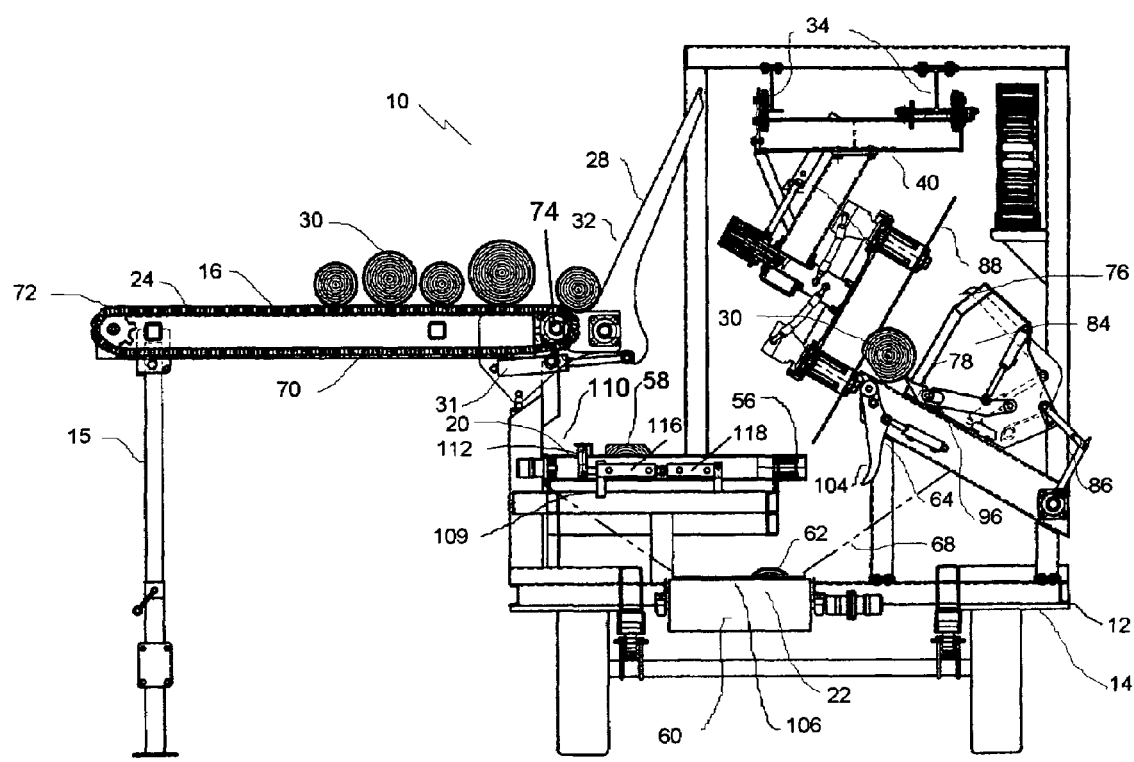
Figure 14:
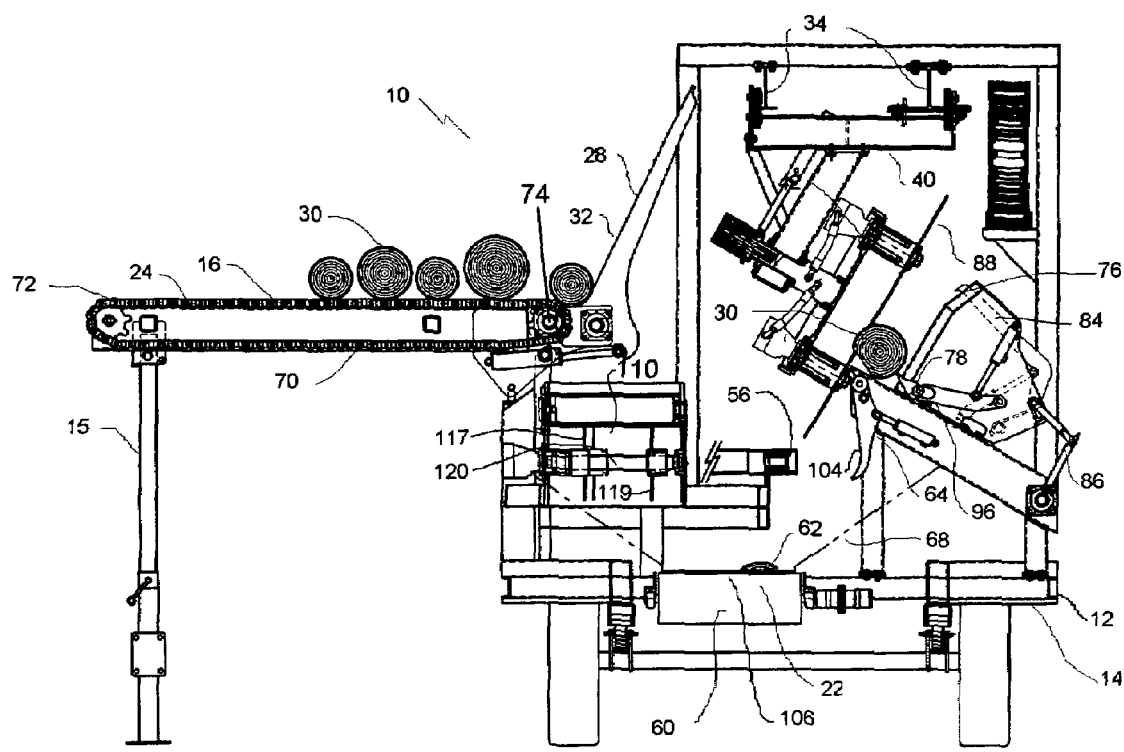
Figure 15:
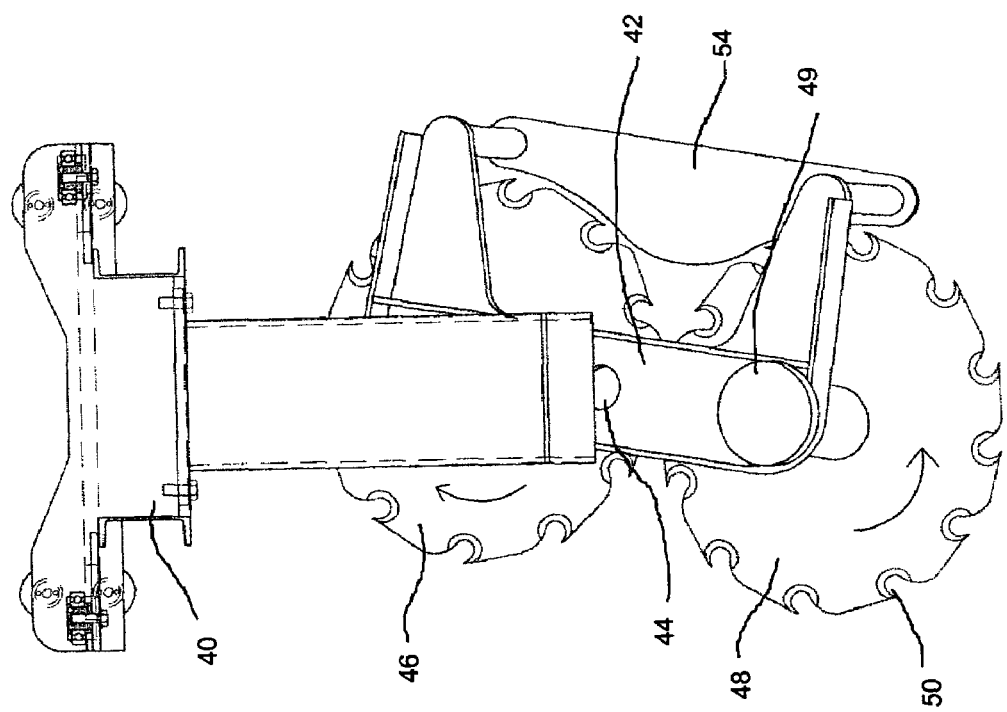
FIG. 15 is a detailed side elevation view of the bidirectional cutting circular saws.

Referring to FIG. 1, a track 34, having a first end 36 and a second end 38 is supported by primary support structure 12 above log support 26. A carriage 40 is movable along track 34 in a first direction from first end 36 shown in FIG. 1 toward second end 38 shown in FIG. 2 and in a second direction from second end 38 toward first end 36. A saw support 42 is pivotally mounted to carriage 40 for pivotal movement about a pivot axis 44 which is transverse to track 34, such that saw support 42 moves with carriage 40 longitudinally along log support 26. As can be seen in FIG. 6, saw support 42 and log support 26 are positioned at 30 degrees offset from vertical, such that gravity assists in log positioning and better visibility is provided to an operator. Referring to FIG. 15, two circular saws 46 and 48 are rotatably mounted with first circular saw 46 mounted above second circular saw 48. Saw support 42 supports the two saw arbors 49 at their midpoint. First circular saw 46 rotates in a first rotational direction and second circular saw 48 rotates in a second rotational direction, with the teeth 50 on both of the two circular saws 46 and 48 always moving toward a log 30 resting on log support 26 as the log 30 is being cut. An actuator (not shown) is included for selectively pivoting saw support 42 to invert the positioning of circular saws 46 and 48 as carriage 40 approaches either first end 36 or second end 38 of track 34, so that teeth 50 on both circular saws 46 and 48 continue to move toward the log 30 being cut upon a change in direction occurring. A splitter 54 is mounted to saw support 42 such that splitter 54 trails, and is common to, circular saws 46 and 48. Referring now to FIG. 10, a roll case 56 is included to handle cut log sections 58 and is positioned adjacent to, and lower than, log support 26 on third level 20 of trailer 14. A waste conveyor 60 for handling waste materials 62 is positioned in a waste collection area 68 on the fifth or bottom level 22 of trailer 14. Referring now to FIGS. 10 and 11 a bridge gate 64 is pivotally secured to log support 26 for movement between an open position shown in FIG. 10 and a closed position shown in FIG. 11. Gate 64 includes arms 104, which are mounted on the front of each log bunk and are actuated in unison. When gate 64 is in the closed position, cut log sections 58 slide down bridge gate 64 by force of gravity to roll case 56 and when gate 64 is in the open position waste material 62 drops onto waste conveyor 60 in waste collection area 68. Waste conveyor 60 moves material on a belt 106 out of portable saw mill 10. Roll case 56 has transversely oriented transfer chains 108. Referring to FIG. 10, transfer chains 108 are raised and lowed by hydraulic actuators 109. Transfer chains 108 have a raised position in which they are raised above roll case 56 and a lowered position in which they are positioned below roll case 56. When in the raised position, transfer chains 108 rest below the cut log sections 58 passing along roll case 56. Referring now to FIG. 11, when a cut log section 58 needing edging is observed, transfer chains 108 are moved to the raised position by hydraulic actuator 109. In the raised position, transfer chains 108 lift cut log sections 58 off roll case 56 and carry cut log section 58 to an edging area 110. The raising and lowering of transfer chains 108 is accomplished by having hydraulic actuator 109 act against a parallelogram frame 111. Referring now to FIGS. 12 and 13, edging area 110 includes a fence 112 actuated by three telescopic actuators 114, 116, and 118, which positions cut log sections 58 relative to two spaced apart edging saws 117 and 119 shown in FIG. 14, where saw 117 is fixed and saw 119 is movable to six positions. Referring to FIG. 12, actuator 114 is fixed on the trailing end of fence 112 and, referring to FIG. 13, actuators 116 and 118 are coupled on the leading end of fence 112. Actuators 114 and 116 are coupled hydraulically in series, moving the fence parallel, while actuator 118 offsets fence 112 at the leading edge to allow for tapered cut log sections 58, also referred to as flitches. While the illustrated embodiment shows two actuator 114 and 116 which are coupled hydraulically in series, it will be appreciated that only one hydraulic actuator can be used. It will also be appreciated actuator can be mechanically coupled instead of hydraulically coupled. Saws 117 and 119 have position indicators (not shown) to show position of saw 119. With edger saw 119 set and flitch 58 lined up as shown in FIG. 12, transfer chains 108 are lowered as shown in FIG. 13 and rollers 121, seen in FIG. 1, carry flitch 58 into edging area 110. Referring now to FIG. 14, edger saws 117 and 119 are hydraulically driven on a saw arbor 120 and, referring to FIG. 1, four feed rollers 122 feed flitches 58 through saws 117 and 119. The two top feed 122 rollers are floating to accommodate various thicknesses. They move the newly cut board onto the outfeed transfer 124 carrying the boards laterally for removal and stacking into finished packages. Outfeed transfer 124 is mounted on a telescopic frame 126 with rollers 128 that slide together to shorten frame 126 for transport. Frame 126 is manually retracted in and extended and locks in its respective positions. FIG. 4 shows frame 126 in an extended position, and FIG. 5 shown frame 126 in a retracted position. Referring to FIG. 3, the cutting process may be observed and controlled by an operator in a controller area 130.

Operation:

The use of portable sawmill 10 will now be discussed with reference to FIGS. 1 through 21. The process begins with a truck tractor towing trailer 14 to a location that has a supply of logs. Log deck 24 is lowered from the transport position shown in FIG. 6 to the horizontal operative position shown in FIG. 7 by retracting telescopic actuator 25. Referring to FIG. 7, leveling jacks 15 are used to support and level log deck 24. Additional leveling jacks (not shown) are provided to stabilize and level sawmill 10. With arms 32 of log loader 28 pointing upward in the non-loading position, logs 30 are loaded onto log deck 24 using, for example, a forklift, or other suitable means. Referring now to FIG. 8, arms 32 are lowered to the loading position, and logs 30 move down arms 32 and come to rest on log support 26. As shown, arms 32 have a protrusion close to shaft 33 that moves log 30 onto the downward slope of arm 32 when lowered, and that also serves to keep other logs 30 from accidentally being moved down as well. Referring now to FIG. 9, after log 30 has been moved to log support 26, arms 32 are then raised once again to the non-loading position. The hydraulic motor (not shown) is then activated to rotate common shaft 74, which in turn rotates sprockets 72 and causes chains 70 to advance logs 30 toward arms 32. Chains 70 are only driven intermittently to feed logs to log loader 28. When loaded onto log support 26, log 30 rests on head blocks 76 and bunks 78. Head blocks 76 are adjusted to accommodate the diameter of log 30 by activating shaft 80, sprockets 82 and roller chains. Dog 84 secures log 30 during sawing. Referring now to FIGS. 1 and 2, circular saws 46 and 48 are moved from first end 36 to second end 38 by carriage 40 which moves along track 34. When the saws travel right to left the bottom saw rotates counterclockwise and cuts downward, and top saw rotates clockwise and cuts upward. Referring again to FIG. 9, while circular saws 46 and 48 are moving, log 30 is cut along saw line 88, and splitter 54 separates the cut section from log 30. With bridge gate 64 in the open position, waste material 62 drops onto waste conveyor 60 in waste collection area 68 on fifth or bottom level 22 of trailer 14. Waste conveyor 60 moves waste material 62 on belt 106 out of sawmill 10. Referring again to FIG. 2, at second end 38, circular saws 46 and 48 are pivoted along with saw support 42 about pivot axis 44, and is then ready to make another cut back from second end 38 to first end 36. Referring now to FIG. 10, dog 84 is raised by telescopic actuator 90 such that log turner 96 can then be raised and rotate log 30 in preparation for the next cut. This process is repeated until all desired cuts have been made to log 30. Referring to FIG. 18, log taper off set on center head block 76 may be activated to move the center core of log 30 out towards saw line 88 and into the longitudinal path of circular saws 46 and 48. After each cut, bridge gate 64 is either open as shown in FIG. 10, or closed as shown in FIG. 11, to move cut log sections 58 to roll case 56. Roll case 56 then moves finished sections 58 out of mill 10. If an unfinished section 58 is observed, transfer chains 108 are moved to the raised position and activated to move section 58 off roll case 56 and carry section 58 to an edging area 110. Fence 112 positions section 58 and rollers 121 move toward edging saws 117 and 119, which are spaced as desired. Referring to FIG. 1, feed rollers 122 then feed sections 58 through saws 117 and 119. The newly edged sections 58 are moved onto outfeed transfer 124 which has been manually extended from the position shown in FIG. 3 to the position shown in FIG. 1.

Advantages:

The present invention uses bi-directional cutting circular saws. When using a single circular saw reverse cutting does not work well as it forces the log upwards and does not allow for a splitter, which is beneficial for safety and saw performance. Band saws can be used but are very high in maintenance and cost when associated with soiled logs commonly found in wood salvage operations. Circular saws use fewer teeth, therefore less maintenance and cost, making the circular saws a better choice in this application. In addition, the bi-directional cutting described herein makes more efficient use of time and labour, as traditional mills that use circular saws cut in one direction only, such that the return cycle is wasted time. In addition, the circular saw is lower maintenance than band saws and more capable in contaminated wood. More production (at least 20,000 board feet per 8 hour shift should be attainable) with less manpower making the sawmill suitable for small woodlot operations. Safety issues are also addressed in the design of the mill. The present design will handle up to 28" diameter trees, although slight modifications may be made to accommodate for different sizes without departing from the invention.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. A portable sawmill with bi-directional cutting circular saws, comprising:

a primary support structure having a first end and a second end;

a log support supported by the primary support structure;

a saw support supported by the primary support structure above the log support;

means for providing relative movement between the log support and the saw support in a first direction from the first end toward the second end and in a second direction from the second end toward the first end;

the saw support being pivotally mounted to the primary support structure for pivotal movement about a pivot axis which is transverse to the direction of movement;

two circular saws rotatably mounted one above the other on the saw support, a first one of the two circular saws rotating in a first rotational direction and a second one of the two circular saws rotating in a second rotational direction, with the teeth on both of the two circular saws always moving toward a log resting on the log support as the log is being cut; and an actuator for selectively pivoting the saw support to invert the positioning of the two circular saws so that the teeth on both of the two circular saws continue to move toward the log being cut upon a change in direction occurring.

2. The portable sawmill as defined in claim 1, wherein:

a track is supported by the primary support structure above the log support, the track having a first end and a second end;

a carriage is movable along the track in a first direction from the first end toward the second end and in a second direction from the second end toward the first end; and the saw support is pivotally mounted to the carriage for pivotal movement about a pivot axis which is transverse to the track, such that the saw support moves with the carriage longitudinally along the log support.

3. The portable sawmill as defined in claim 1, wherein a splitter is mounted to saw support, the splitter trailing and being common to the two circular saws.

4. The portable sawmill as defined in claim 1, wherein the primary support structure is a trailer.

5. The portable sawmill as defined in claim 4, wherein the trailer has levelling jacks.

6. The portable sawmill as defined in claim 4, wherein a log deck is provided to feed logs onto the log support, the log deck having a substantially vertical transport position and a substantially horizontal operative position.

7. The portable sawmill as defined in claim 6, wherein a telescopic actuator is provided to move the log deck between the transport position and the operative position.

8. The portable sawmill as defined in claim 6, wherein levelling jacks are provided to support the log deck in the operative position.

9. The portable sawmill as defined in claim 6, wherein a log loader is provided to move logs from the log deck to bunks on the log support, the log loader having arms pivotally mounted to the log deck which are moved by telescopic actuators from a non-loading position to a loading position, in the loading position the arms are downwardly inclined such that logs move by force of gravity down the arms coming to rest in the bunks of the log support.

10. The portable sawmill as defined in claim 1, wherein head blocks are provided on the log support, the head blocks being movable to suit various log diameters, each head block having a dog for securing a log during sawing, each dog having an arresting link that limits travel of the dog with the head block relative to a saw line, so that the dog does not impinge upon the saw line.

11. The portable sawmill as defined in claim 1, wherein the log support includes log turners, the log turners being in the form of hooks which engage the log support from below and retract to an underlying position after rotating the log.

12. The portable sawmill as defined in claim 11, wherein the hooks on the log turners have pivoting tips, that pivot to facilitate the hooks disengaging from the log and retracting.

13. The portable sawmill as defined in claim 1, wherein the log support includes means for moving a center core of the log into the longitudinal path of the two circular saws, thereby increasing wood recovery from tapered logs.

14. The portable sawmill as defined in claim 1, wherein a roll case for handling cut log section is positioned adjacent to and lower than the log support, a bridge gate being pivotally secured to the log support which is movable between an open position and a closed position, such that when the gate is in the closed position cut log sections slide down the bridge gate to the roll case and when the gate is in the open position waste material drops into a waste collection area.

15. The portable sawmill as defined in claim 14, wherein a waste conveyor carries waste material from the waste collection area.

16. The portable sawmill as defined in claim 14, wherein the roll case has transversely oriented transfer chains, the transfer chains have a raised position above the surface of the roll case and a lowered position below the surface of the roll case, when the transfer chains are in the lowered position cut log sections pass along the roll case, when a cut log section needing edging is observed the transfer chains are raised, when the transfer chains are in the raised position they lift the cut log section off the roll case and carry the cut log section to an edging area.

17. The portable sawmill as defined in claim 16, wherein the edging area includes a fence actuated by telescopic actuators, which positions the cut log section relative to spaced apart edging saws.

18. The portable sawmill as defined in claim 1, wherein the saw support and the log support are positioned at 30 degrees offset from vertical, such that gravity assists in log positioning and better visibility is provided to an operator.

19. A portable sawmill with bidirectional cutting circular saws, comprising:

a primary support structure in the form of a trailer having levelling jacks, the trailer having a top level, a second level, a third level, a fourth level and a bottom level;

a log deck on the top level of the trailer, the log deck having a substantially vertical transport position and a substantially horizontal operative position;

a log support on the second level of the trailer;

a log loader to move logs from the log deck to the log support, the log loader having arms pivotally mounted to the log deck which are moved by telescopic actuators from a non-loading position to a loading position, in the loading position the arms are downwardly inclined such that logs move by force of gravity down the arms coming to rest on the log support;

a track supported by the primary support structure above the log support, the track having a first end and a second end;

a carriage movable along the track in a first direction from the first end toward the second end and in a second direction from the second end toward the first end;

a saw support pivotally mounted to the carriage for pivotal movement about a pivot axis which is transverse to the track, such that the saw support moves with the carriage longitudinally along the log support;

two circular saws rotatably mounted one above the other on the saw support, a first one of the two circular saws rotating in a first rotational direction and a second one of the two circular saws rotating in a second rotational direction, with the teeth on both of the two circular saws always moving toward a log resting on the log support as the log is being cut;

an actuator for selectively pivoting the saw support to invert the positioning of the two circular saws as the carriage approaches either the first end or the second end of the track, so that the teeth on both of the two circular saws continue to move toward the log being cut upon a change in direction occurring;

a splitter mounted to saw support, the splitter trailing and being common to the two circular saws;

a roll case for handling cut log section is positioned adjacent to and lower than the log support on the third level of the trailer;

an outfeed transfer for cut log sections is positioned on the fourth level of the trailer in communication with the roll case;

a waste conveyor for handling waste materials is positioned in a waste collection area on a bottom level of the trailer;

a bridge gate is pivotally secured to the log support for movement between an open position and a closed position, when the gate is in the closed position cut log sections slide down the bridge gate by force of gravity to the roll case and when the gate is in the open position waste material drops onto the waste conveyor in the waste collection area.

20. The portable sawmill as defined in claim 19, wherein a telescopic actuator is provided to move the log deck between the transport position and the operative position.

21. The portable sawmill as defined in claim 20, wherein levelling jacks are provided to support the log deck in the operative position.

22. The portable sawmill as defined in claim 19, wherein the log support includes head blocks and bunks, the head blocks being movable to suit various log diameters, each head block having a dog for securing a log during sawing, each dog having an arresting link that limits travel of the dog with the head block relative to a saw line, so that the dog does not impinge upon the saw line.

23. The portable sawmill as defined in claim 19, wherein the log support includes log turners, the log turners being in the form of hooks which engage a log supported on the log support from below and retract to an underlying position after rotating the log.

24. The portable sawmill as defined in claim 23, wherein the hooks on the log turners have pivoting tips, that pivot to facilitate the hooks disengaging from the log and retracting.

25. The portable sawmill as defined in claim 19, wherein the log support includes means for moving a center core of the log into the longitudinal path of the two circular saws, thereby increasing wood recovery from tapered logs.

26. The portable sawmill as defined in claim 19, wherein the roll case has transversely oriented transfer chains, the transfer chains have a raised position above the surface of the roll case and a lowered position below the surface of the roll case, when the transfer chains are in the lowered position cut log sections pass along the roll case, when a cut log section needing edging is observed the transfer chains are raised, when the transfer chains are in the raised position they lift the cut log section off the roll case and carry the cut log section to an edging area.

27. The portable sawmill as defined in claim 26, wherein the edging area includes a fence actuated by telescopic actuators, which positions the cut log section relative to spaced apart edging saws.

28. The portable sawmill as defined in claim 19, wherein the saw support and the log support are positioned at 30 degrees offset from vertical, such that gravity assists in log positioning and better visibility is provided to an operator.

* * * * *